(12) United States Patent
Fulton et al.

(10) Patent No.: US 9,417,970 B2
(45) Date of Patent: Aug. 16, 2016

(54) DATA FILE PROCESSING FOR A WELL JOB DATA ARCHIVE

(71) Applicant: HALLIBURTON ENERGY SERVICES, INC., Houston, TX (US)

(72) Inventors: Dwight David Fulton, Cypress, TX (US); Jon Matthew Orth, Katy, TX (US); Pooja Nitin Khanapurkar, Pune (IN); Venu Madhav Reddy Amudala, Hyderabad (IN)

(73) Assignee: Halliburton Energy Services, Inc., Houston, TX (US)

( * ) Notice: Subject to any disclaimer, the term of this patent is extended or adjusted under 35 U.S.C. 154(b) by 172 days.

(21) Appl. No.: 14/192,602

(22) Filed: Feb. 27, 2014

(65) Prior Publication Data

US 2015/0242411 A1    Aug. 27, 2015

(51) Int. Cl.
 *G06F 17/30* (2006.01)
 *G06F 11/14* (2006.01)

(52) U.S. Cl.
 CPC ........ *G06F 11/1453* (2013.01); *G06F 17/3015* (2013.01); *G06F 2201/80* (2013.01)

(58) Field of Classification Search
 CPC .......... G06F 17/30073; G06F 2201/80; G06F 11/1453; G06F 17/30; G06F 17/301; E21B 49/087; E21B 47/122; E21B 47/14; E21B 49/003; E21B 49/08; E21B 7/00; E21B 10/42; E21B 12/02; E21B 17/042; E21B 21/002; E21B 23/06; E21B 29/002; E21B 33/127
 USPC .................................... 707/769, 671; 705/37
 See application file for complete search history.

(56) References Cited

U.S. PATENT DOCUMENTS

| | | | | |
|---|---|---|---|---|
| 6,980,940 | B1 * | 12/2005 | Gurpinar | E21B 43/00 702/13 |
| 7,478,024 | B2 * | 1/2009 | Gurpinar | E21B 43/00 702/13 |
| 7,818,071 | B2 * | 10/2010 | Hartkamp | G05B 15/02 700/29 |
| 2003/0074302 | A1 * | 4/2003 | Cope | G06Q 10/06 705/37 |
| 2005/0149307 | A1 * | 7/2005 | Gurpinar | E21B 43/00 703/10 |

(Continued)

OTHER PUBLICATIONS

Yidong Cai, Dameng Liu , Yanbin Yao, Jungian Li, Yongkai Qiu—Geological controls on prediction of coalbed methane of No. 3 coal seam in Southern Qinshui Basin, North China—International Journal of Coal Geology—vol. 88, Issues 2-3, Nov. 1, 2011, pp. 101-112.*

(Continued)

*Primary Examiner* — Anh Ly
(74) *Attorney, Agent, or Firm* — Craig W. Roddy; Fish & Richardson P.C.

(57) ABSTRACT

A method, system, and apparatus, including a program encoded on computer-readable medium, for detecting duplicate data files to be stored in a well job data archive includes identifying a well job data file for storage in a well job data archive and performing an initial duplicate check and a secondary duplicate check to determine if the well job data file is a duplicate of a data file stored in the well job data archive, as well as a quality assurance test of the file data. At least one of the well job data file or one or more of the data files stored in the well job data archive is identified as a duplicate data file based on the initial and secondary duplicate checks, and the well job data file is stored in the well job data archive in accordance with the initial and secondary duplicate checks and the identification of a duplicate data file.

17 Claims, 4 Drawing Sheets

(56) References Cited

U.S. PATENT DOCUMENTS

| | | | | |
|---|---|---|---|---|
| 2005/0165881 | A1* | 7/2005 | Brooks | G06F 9/5027 709/200 |
| 2007/0156377 | A1* | 7/2007 | Gurpinar | E21B 43/00 703/10 |
| 2008/0035334 | A1* | 2/2008 | Newman | E21B 17/00 166/250.01 |
| 2008/0059002 | A1* | 3/2008 | Hartkamp | G05B 15/02 700/299 |
| 2008/0264649 | A1* | 10/2008 | Crawford | E21B 19/22 166/381 |
| 2010/0260270 | A1* | 10/2010 | Kapoor | H04N 21/23439 375/240.27 |
| 2011/0040536 | A1* | 2/2011 | Levitan | E21B 49/00 703/2 |
| 2011/0276594 | A1* | 11/2011 | Chong | G06F 11/3006 707/769 |
| 2012/0176251 | A1 | 7/2012 | Klass et al. | |
| 2013/0073268 | A1* | 3/2013 | Abacioglu | E21B 41/0092 703/2 |
| 2015/0067819 | A1* | 3/2015 | Shribman | H01L 65/4084 726/12 |
| 2015/0094960 | A1* | 4/2015 | Kadayam Viswanathan | G01V 11/00 702/13 |

OTHER PUBLICATIONS

Jorge A. Romero, Nirup Menon, Rajiv D. Banker, and Mark Anderson—"ERP : Drilling for Profit in the Oil and Gas Industry"—communications of the acm | Jul. 2010 | vol. 53 | No. 7—Published in: Magazine Communications of the ACM—vol. 53 Issue 7, Jul. 2010—pp. 118-121.*

Craig, "Tools and Workflows to Help Manage the Larger Data Management System", Landmark—A Halliburton Company, Copyright 2004, 18 pages.

* cited by examiner

| Test | Job Name | Start Date | Company | Well Name | Well Number | Well County | SurfClnVol | ACTION |
|---|---|---|---|---|---|---|---|---|
| 1 | X <> Y | X = Y | X <> Y | X <> Y | X <> Y | X <> Y | | Two different jobs -- both files = SOURCE |
| 2 | X = Y | X <> Y | X = Y | X = Y | X = Y | X = Y | | Two different jobs -- both files = SOURCE |
| 3 | X = Y | X <> Y | X = Y | X = Y | X = Y | X = Y | X <> 0 AND Y <> 0 AND X <> Y | Probable job restart -- file with SurfClnVol <> 0 = SOURCE; other = DUPLICATE |
| 4 | X <> Y | X = Y | X = Y | X = Y | X = Y | X = Y | X = 0 OR Y = 0 | Probable recalc of initial job file, fixing Job Name -- file with SurfClnVol <> 0 = SOURCE; other = DUPLICATE |
| 5 | X = Y | X <> Y | X = Y | X = Y | X = Y | X = Y | X = 0 OR Y = 0 | Two unsuccessful jobs -- both files = SOURCE |
| 6 | X = Y_Recalc* OR X_Recalc* = Y | X = Y | X = Y | X = Y | X = Y | X = Y | X = 0 AND Y = 0 | Almost certain Recalc -- Recalc = SOURCE; other = DUPLICATE |
| 7 | X = Y_Recalc* | X = Y | X = Y | | X = Y | | X = 0 | Initial file not complete -- Recalc = SOURCE; other = DUPLICATE |
| 8 | X_Recalc* = Y | X = Y | X = Y | X = Y | X = Y | | Y = 0 | Initial file not complete -- Recalc = SOURCE; other = DUPLICATE |
| 9 | X_Recalc* = Y_Recalc* | X = Y | X = Y | X = Y | X = Y | X = Y | | Multiple Recalcs -- file with highest Recalc number = SOURCE; other = DUPLICATE |

FIG. 4

DATA FILE PROCESSING FOR A WELL JOB DATA ARCHIVE

BACKGROUND

This description relates to processing data files for a well job data archive, and more particularly to checking well job files containing data pertaining to production well jobs for storage in the well job data archive.

Stimulation treatments used in the oil and gas industry generally facilitate the extraction of hydrocarbons from production wells. Such treatments can involve hydraulic fracturing or acidizing to increase the flow of hydrocarbons toward the well bore. Generally, a stimulation treatment includes pumping liquids into a well. Information regarding a stimulation treatment (e.g., chemicals used, location, conditions, well job identification data, and field data) can be collected and stored for subsequent analysis and data mining. For example, well job data for one or more treatments performed on a well can be stored in a database that includes well job data for treatments performed on any number of other wells. Such well job data can be aggregated, compared, or manipulated to generate reports, which, for example, may reveal trends or provide sets of data aggregated according to a desired parameter value.

DESCRIPTION OF DRAWINGS

Like reference symbols in the various drawings indicate like elements.

DETAILED DESCRIPTION

In accordance with aspects described in this specification, well job data files can be stored in a well job data archive for use in analyzing or mining data from past well jobs. The well job data archive can be used to search for well job data files that contain certain parameter values, which can be useful, for example, to generate reports showing well job data for a particular geographical area (e.g., county), a particular geological formation, a specific customer, a range of dates, or any other desired parameter values or collection of parameter values. Data mining or analyses can be performed on identified well job data files to, for example, attempt to identify trends, attributes of successful well jobs, statistical information regarding well jobs, or any other suitable purpose. In general, a well job can include data regarding a stimulation treatment (e.g., hydraulic fracturing or acidizing) on a single well bore. The data can include any form of information about conditions, timing, measurements, location, equipment, chemicals, or other information relating to a stimulation treatment. The data can be in the form of parameter values associated with a parameter or field (e.g., job name, start date, well name, etc.) in a database. Each well can have one or more data files containing information gathered during one or more stimulation treatments. For example, different files for a particular well may contain information related to different stimulation treatments or, in some implementations, a particular file may contain information related to more than one stimulation treatment. Generally, a file does not contain data on more than one well. Typically, the data files contain information collected for production wells, although certain implementations may involve data files for other types of wells (e.g., injection wells, storage wells, or disposal wells). Production wells can be used to extract, for example, petroleum, natural gas, or other liquids or gases.

Well job data files can be loaded into the well job data archive through an automatic system that scans servers on which well job data files are generated or stored and loads the appropriate files into the archive. Alternatively, well job data files can be loaded into the well job data archive using a computer application through which users can upload well job data files. With either loading mechanism, duplicate job data files or files with missing, corrupt, or incorrect data can be entered into the archive. Duplicate files or files with incorrect data can jeopardize data mining results and can unnecessarily increase the size of the archive.

Accordingly, when well files are loaded for storage in the well job data archive, processes can be used to automatically detect and prevent storage or retrieval of duplicate copies of well job data files, and to identify or prevent storage of incomplete or erroneous data files in the repository of electronic well job data files (i.e., the well job data archive). Software executing on one or more computers, for example, can be used to analyze incoming data files and take appropriate action, which may include providing feedback to a user that submits the file and to a database administrator. The software can perform an initial duplicate check to determine if the well job data file is identical to a data file in the well job data archive and can perform a secondary duplicate check to determine if the well job data file corresponds to a well job that already has a corresponding data file in the well job data archive. In general, the initial duplicate check can focus on comparing the file size and/or a checksum for each file to be analyzed as possible duplicates. In this context, a checksum can include any suitable technique for identifying identical files (e.g., a hash value generated by a hash function or a digital fingerprint generated by a fingerprinting algorithm). The secondary duplicate check can focus on comparing parameter values to determine whether two or more well job data files pertain to the same well job (e.g., the same stimulation treatment on a particular well).

A quality assurance check can also be performed on each well job data file to identify whether any critical or non-critical parameter values are missing or erroneous in the well job data file. In this context, a critical parameter value can be determined according to whether the well job data file can be stored for subsequent access in the well job data archive. For example, a well job data file with an erroneous or missing critical value may be stored in the archive but may need to be corrected and/or reloaded into the archive for the file to be accessed in certain types of searches or analyses. Missing or erroneous non-critical parameter values, on the other hand, may not prevent a well job data file from being stored and accessible in the well job data archive but may result in a request to a user or administrator to correct the errors. Criteria for determining whether a parameter value is critical or non-critical can be predetermined (e.g., by an administrator or when the well job data archive is created) for a well job data archive, a particular implementation thereof, or based on categories of well job data files (e.g., such that different categories of well job data files may have different criteria for critical and non-critical parameter values). Such criteria can be programmed into the software or selected as configuration options when configuring the well job data archive or the software or systems that perform the checking processes. In general, the quality assurance check on a well job data file can be performed after performing the secondary duplicate check. The quality assurance check can result in the well job data file passing, conditionally passing, or being rejected. In general, a file that passes the quality assurance check can be loaded into the archive for data mining access, while a file that is rejected is either not loaded into the archive or is not made available for data mining or analysis. A conditionally passed file can be loaded into the archive but may require corrections. A notification of the quality assurance check results can be automatically sent to a user and/or an administrator. Similarly, users and/or administrators can be notified of data files that are identified as duplicates. Such notifications can be used to, among other things, facilitate correction of errors and educate users to avoid similar errors in future files.

Figure 1:
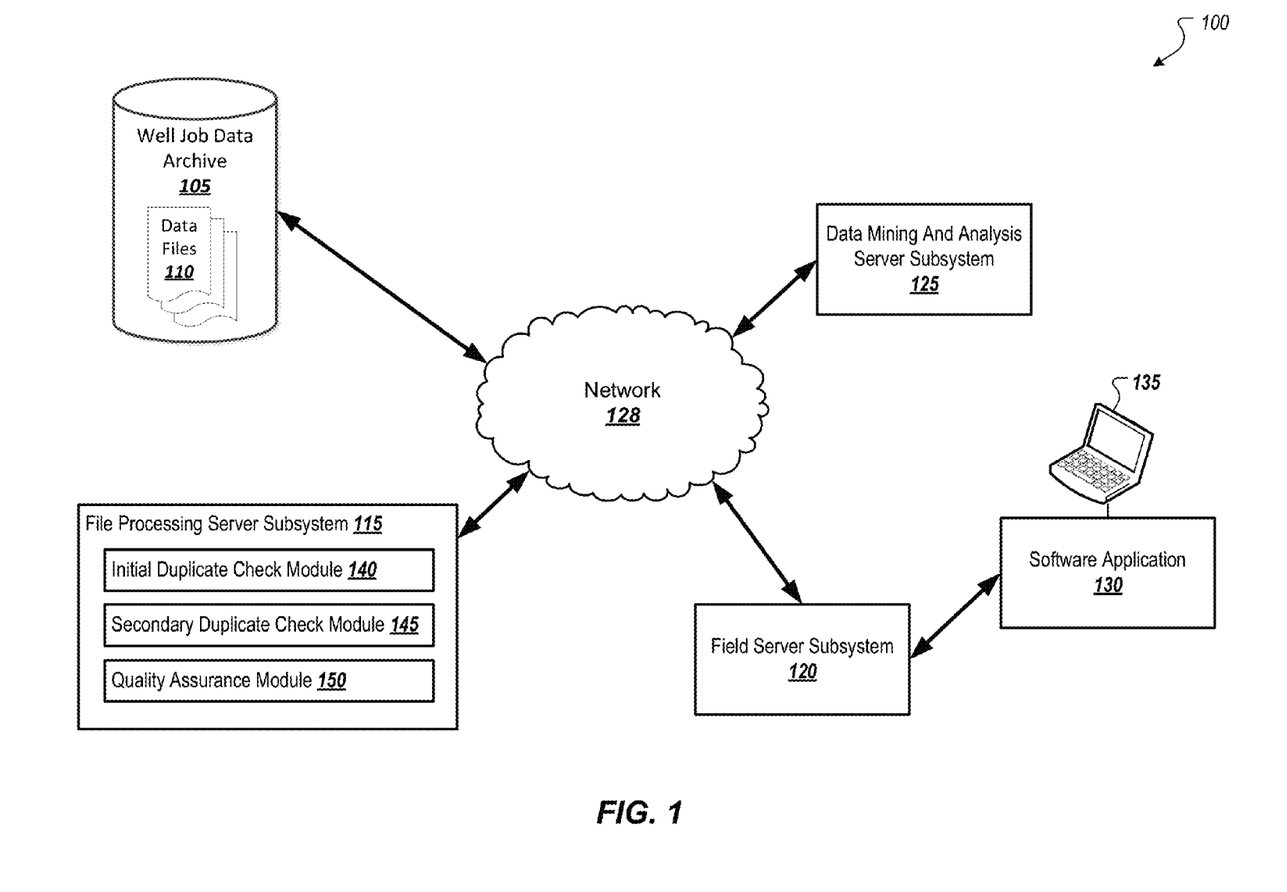
FIG. 1 is a block diagram of a system for performing duplicate and quality assurance checks on a well job data file.

FIG. 1 is a block diagram of a system 100 for performing duplicate and quality assurance checks on a well job data file. The system includes a well job data archive 105 that stores well job data files 110, a file processing server subsystem 115, a field server subsystem 120, and a data mining and analysis server subsystem 125. The subsystems and data archive 105 can communicate with one another through a network 128. In general, well job data files created in the field server subsystem 120 can be processed by the file processing server subsystem 115. Such processing can involve performing duplicate or quality assurance tests on the well job data files before or as the files are stored in the well job data archive 105. The well job data files 110 can subsequently be accessed and analyzed by the data mining and analysis server subsystem 125 to perform any suitable data mining or analysis of data contained in the well job data files 110.

Well job data files 110 can be created in the field server subsystem 120 using a software application 130 on or accessible from field user computers 135, which may present graphical user interfaces that enable field users to enter parameter values for predefined or user-defined parameters and/or which may automatically populate parameter values received from sensors or other data sources or calculated by data collection software. A user can manually initiate, through the software application 130, loading of a well job data file into the well job data archive 105. Alternatively or in addition, the file processing server subsystem 115 can automatically scan the field server subsystem 120 for well job data files 110 to be loaded into the well job data archive 105.

Before storing the well job data files 110 in the well job data archive 105, however, the file processing server subsystem 115 can perform checks on the data files 110 to ensure completeness, accuracy, uniqueness, usability, authenticity, and/or integrity of the data files 110. The file processing server subsystem 115 includes an initial duplicate check module 140, a secondary duplicate check module 145, and a quality assurance module 150.

The initial duplicate check module 140 determines if a well job data file 110 is a duplicate of a data file already stored in the well job data archive 105. The initial duplicate check can be based on a comparison of a size of the well job data file 110 to be loaded and a size of one or more data files 110 previously stored in the well job data archive 105. Alternatively or in addition, the initial duplicate check can be based on a comparison of a checksum of the well job data file 110 to be loaded and a checksum of one or more data files 110 previously stored in the well job data archive 105.

The secondary duplicate check module 145 performs an additional determination of whether the well job data file 110 to be loaded is a duplicate of a data file 110 already stored in the well job data archive. The secondary duplicate check module 145 compares values of multiple parameters contained in the well job data file 110 to be loaded to values of corresponding parameters of one or more data files 110 previously stored in the well job data archive 105. In general, the secondary duplicate check is used to identify duplicate files that are not exact file duplicates (i.e., all of the data in the files are not exactly duplicated) but the files pertain to the same well job even though one or more parameter values may differ. The parameters used in the secondary duplicate check can include, for example, job identification information, well identification information, well location, a job-related date (e.g., start or end date), a job client (e.g., an entity for which the well job is performed), or a volume of fluids associated with a job (e.g., a volume of fluids pumped into a well). If selected parameter values for two or more well job data files 110 are identical, the secondary duplicate check module 145 may determine that the two or more well job data files 110 are duplicates. Which file is identified as the file to be used as a data source (e.g., for subsequent data mining and analysis) can be based, for example, on tests of which parameter values are the same and which are different.

The quality assurance module 150 performs a quality assurance check on the well job data file 110 to be uploaded. The quality assurance check may be performed, for example, after performing the secondary duplicate check. As noted above, the quality assurance check can include a check of critical parameter values and a check of non-critical parameter values. In an example implementation, critical parameter values that result in a failed quality assurance check can include an empty job name parameter, an empty or invalid job sales order identifier parameter, a well name parameter and a well number parameter both being empty, an empty well country parameter, an empty job client parameter, or an invalid job-related date (e.g., a future date or a date that precedes a predetermined date before which no jobs were performed). Example non-critical parameter values that result in a failed quality assurance check can include one (but not both) of a well name parameter or a well number parameter being empty, an empty or invalid API (American Petroleum Institute) well number, an empty well county parameter, an empty well state parameter, or an invalid or incomplete job name (e.g., a job name that does not include components required by a naming convention for the well job data archive 105).

Based on the checks performed by the file processing server subsystem 115 on a data file 110 to be loaded into the archive 105, the data file 110 can be stored in the well job data archive 105 and/or other appropriate actions can be taken. For example, a field user or an administrator can be notified (e.g., in an email or through the software application 130) of any errors or missing data for correction or other handling (e.g., re-uploading). As another example, the data file 110 can be stored in the archive but flagged as a duplicate or as including critical or non-critical errors. As another example, a determination can be made as to which of two files 110 identified as duplicates is to be used for subsequent data mining and analysis. In some implementations, the incoming data file 110 can be loaded into the archive 105 upon passing the initial duplicate check but can be identified (e.g., using a flag or other indicator) as a duplicate and thus as not to be used for data mining and analysis. Alternatively, a previously stored data file 110 can be identified as a duplicate and as not to be used for data mining and analysis while use of the newly loaded file 110 is permitted for data mining and analysis. Such stored but duplicate data files 110 may be retained for some period of time and/or may be purged from the archive 105 (e.g., by an administrator or as part of a periodic, automatic purge process). In some implementations, job data files 110 that fail a critical parameter value check can be stored in the archive 105 but flagged as containing errors and thus as not to be used for data mining and analysis (at least not until the errors are corrected), while job data files 110 that fail a non-critical parameter value check can be stored in the archive 105 and made available for use in data mining and analysis.

The data mining and analysis server subsystem 125 can be used to perform data mining and analysis on data contained in the well job data files 110 stored in the well job data archive 105. As noted above, the availability of the well job data files 110 for use in such data mining and analysis can be determined according to the processing of the well job data files 110 by the file processing server subsystem 115. In some implementations, the well job data files 110 may also be individually accessed (e.g., through the field server subsystem 120 or other computer systems granted access to the archive) to retrieve data pertaining to a particular well job despite being flagged as not for use in data mining and analysis.

Figure 2:
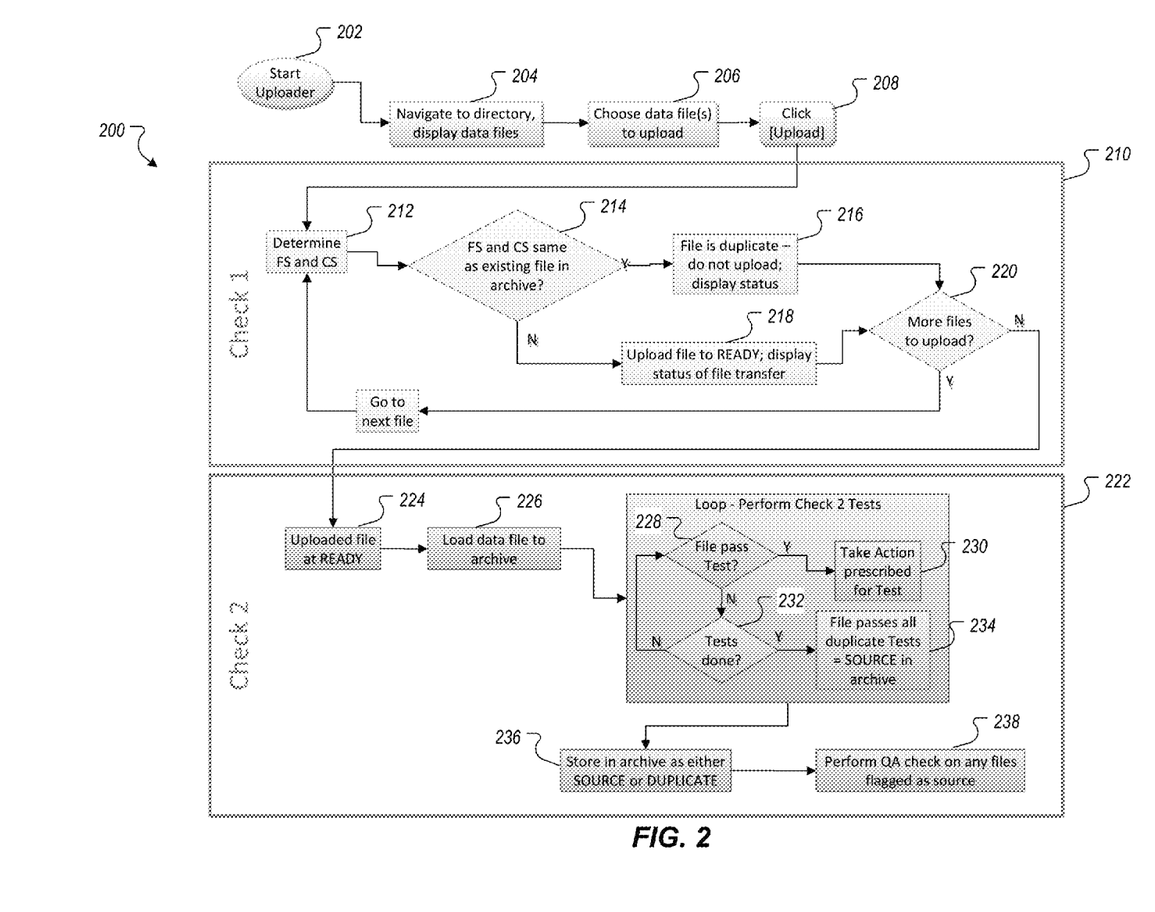
FIG. 2 is a flow diagram of an example method for performing duplicate checks on well job data files for storage in a well job data archive.

FIG. 2 is a flow diagram of an example method 200 for performing duplicate checks on well job data files for storage in a well job data archive. The method 200 can be executed, for example, using software on a user computer or through an interface provided by a server system (e.g., the file processing server subsystem 115 or the field server subsystem 120 discussed in connection with FIG. 1). An uploader application is started at 202. Using the uploader application, a user can navigate to a directory that displays available well job data files at 204. The user can select individual files or groups of files among the available files to be uploaded at 206 and can initiate the uploading process at 208 (e.g., by clicking on an upload button). An initial duplicate check process 210 is then initiated for the selected set of files.

The initial duplicate check process 210 includes determining a file size (FS) and file checksum (CS) for one of the files in the selected set at 212. A check is performed at 214 to determine if the file size and checksum are the same as a well job data file that is already stored in the data archive. If so, the file is identified as a duplicate at 216. The file is therefore not uploaded and the user can be notified of the duplicate status (e.g., by displaying a notification on a user interface of the uploader application). If the file size and checksum are not the same as any well job data files already stored in the data archive, the file can be uploaded and flagged as being ready for secondary duplicate checking at 218. The user can be notified that the file has passed the initial duplicate check. At 220, a determination is made as to whether there are additional files in the selected set of files not yet processed in the initial duplicate check process 210. If so, the process 210 returns to 212 for the next file in the selected set. Once all of the files in the set have been processed through the initial duplicate check process 210, a secondary duplicate check process 222 is initiated.

The secondary duplicate check process 222 can sequentially process each of the files identified at 218 as being ready for secondary duplicate checking. A file is selected at 224 and is uploaded to the archive at 226. A series of duplicate checking tests are performed on the file at 228. Each test can be performed to compare the "ready" file to each file in the archive to determine if the file is a duplicate of the file already in the archive. If the file passes a test, an action prescribed for the test is performed at 230. Actions can include, for example, identifying one of the files as a duplicate and one as a data source for use in subsequent data mining and analysis or determining that a pair of compared files are not duplicates. Examples of tests that can be used and actions that are performed are discussed below in connection with FIG. 4. Files that are identified as duplicates can be stored in the archive but marked as not for use in data mining and analysis. If the file is not identified as a duplicate of any file already in the archive, a determination is made at 232 as to whether all of the tests are complete. If not, the secondary duplicate check process 222 returns to 228 to perform additional tests on the data file. If all tests are complete and the file has not been prescribed for action at 230, the file is identified at 234 as not being a duplicate and thus is marked as a data source for use in subsequent data mining and analysis. Based on the results of the tests, the file is stored in the database with the appropriate marking as a data source or a duplicate at 236. Files marked as data sources can be further processed through quality assurance checks at 238.

Figure 3:
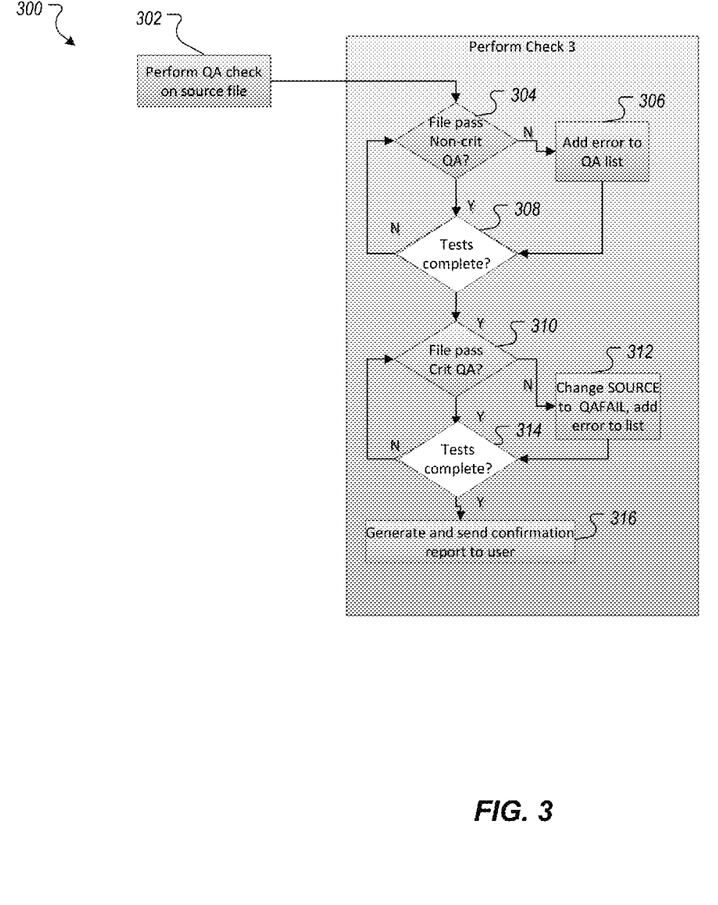
FIG. 3 is a flow diagram of an example method for performing quality assurance checks on well job data files for storage in a well job data archive.

FIG. 3 is a flow diagram of an example method 300 for performing quality assurance checks on well job data files for storage in a well job data archive. As with the method 200 of FIG. 2, the method 300 can be executed, for example, using software on a user computer or through an interface provided by a server system (e.g., the file processing server subsystem 115 or the field server subsystem 120 discussed in connection with FIG. 1) and can be performed using the same uploader application as discussed in connection with FIG. 2. A data file to be checked for quality assurance is identified at 302 and a determination is made for the identified file as to whether the file passes a non-critical quality assurance test at 304. If the file does not pass the non-critical quality assurance test, the errors identified in the tests are added to the quality assurance list at 306. A determination is made at 308 as to whether all non-critical quality assurance tests have been performed on the file. If not, the process returns to 304 for performance of additional tests. If all non-critical quality assurance tests have been performed on the file, a determination is made for the file as to whether the file passes a critical quality assurance test at 310. If the file does not pass the critical quality assurance test, the data source making for the file is removed and the file is marked at 312 as having failed the quality assurance test (QAFAIL) and thus the file is not made available as a data source for data mining and analysis. A determination is made at 314 as to whether all non-critical quality assurance tests have been performed on the file. If not, the process returns to 310 for performance of additional tests. If all critical quality assurance tests have been performed on the file, a communication is sent to a user or administrator and/or a message is displayed in the uploader application at 316 indicating any errors identified in the non-critical quality assurance and critical quality assurance tests.

Figure 4:
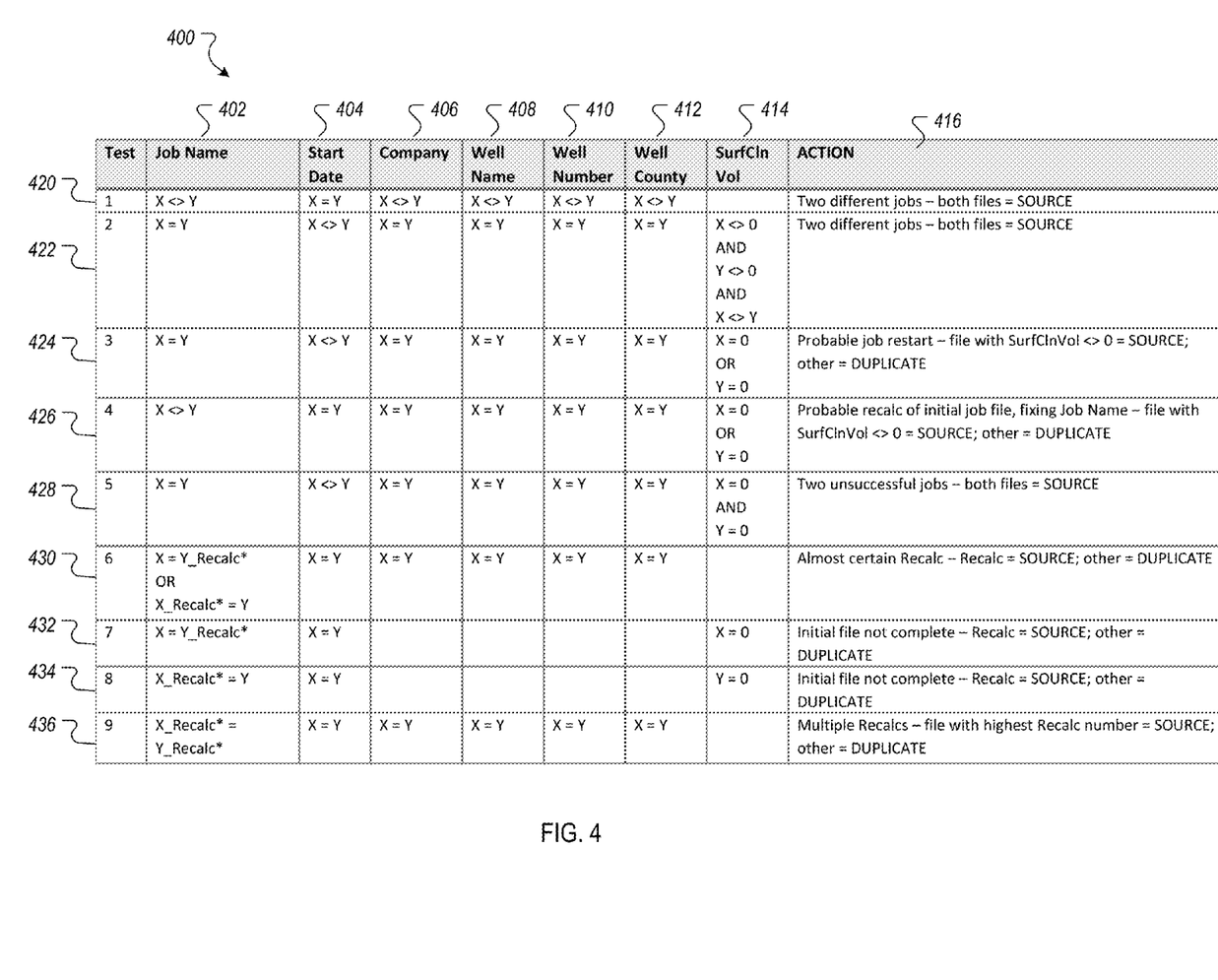
FIG. 4 depicts a chart summarizing example secondary duplicate checking tests that can be performed on a well job data file to be stored in a well job data archive.

FIG. 4 depicts a chart 400 summarizing example secondary duplicate checking tests that can be performed on a well job data file to be stored in a well job data archive. The chart 400 summarizes tests that may be performed, for example, at operation 228 of FIG. 2. Each test involves comparing parameter values from an incoming file X that is being stored in the archive with parameter values of an existing file Y in the archive. In some cases, the files can be recalculated or updated (e.g., to correct errors), which is designated in the chart 400 as "X_Recalc*" (i.e., for a recalculation of a file X) or "Y_Recalc*" (i.e., for a recalculation of a file Y). In these example tests, the parameters can include one or more of a job name parameter 402, a start date parameter 404, a company or client parameter 406, a well name parameter 408, a well number parameter 410, a well county parameter 412, and a surface clean volume (SurfClnVol) parameter 414, which is used to identify a volume of fluids pumped into the well. In general, the surface clean volume parameter is used to determine if a stimulation treatment job actually occurred. An empty or zero value for the surface clean volume parameter can indicate that a job did not actually occur. The chart 400 also includes a corresponding action 416 that results from satisfying a particular test. The parameter conditions for each test in this example are implied to be connected with a Boolean logical "AND", meaning passing a given test requires satisfaction of all parameter conditions of the test.

A first test 420 involves checking if values for a start date parameter 404 match between an incoming file X and an existing file Y, while values do not match for a job name parameter 402, a company or client parameter 406, a well name parameter 408, a well number parameter 410, and a well county parameter 412. If so, the files are identified as being associated with two different jobs. Thus, as indicated in the action column 416, both files are identified as source files available for use in data mining and analysis.

A second test 422 involves checking if values match between an incoming file X and an existing file Y for a job name parameter 402, a company or client parameter 406, a well name parameter 408, a well number parameter 410, and a well county parameter 412, while values do not match for a start date parameter 404 and a surface clean volume parameter 414, and further that the surface clean volume parameter 414 is not zero or null for either incoming file X or existing file Y. If so, the files are identified as being associated with two different jobs. Thus, as indicated in the action column 416, both files are identified as source files available for use in data mining and analysis.

A third test 424 involves checking if values match between an incoming file X and an existing file Y for a job name parameter 402, a company or client parameter 406, a well name parameter 408, a well number parameter 410, and a well county parameter 412, while values do not match for a start date parameter 404, and further that the surface clean volume parameter 414 is zero or null for either incoming file X or existing file Y (but not both). If so, the files are identified as likely being associated with the same job that was restarted. Thus, as indicated in the action column 416, the file with the non-zero value for the surface clean volume parameter 414 is identified as a source file, and the other file is identified as a duplicate.

A fourth test 426 involves checking if values match between an incoming file X and an existing file Y for a start date parameter 404, a company or client parameter 406, a well name parameter 408, a well number parameter 410, and a well county parameter 412, while values do not match for a job name parameter 402, and further that the surface clean volume parameter 414 is zero or null for either incoming file X or existing file Y (but not both). If so, the files are identified as likely being associated with the same job that was recalculated or updated. Thus, as indicated in the action column 416, the file with the non-zero value for the surface clean volume parameter 414 is identified as a source file, and the other file is identified as a duplicate.

A fifth test 428 involves checking if values match between an incoming file X and an existing file Y for a job name parameter 402, a company or client parameter 406, a well name parameter 408, a well number parameter 410, and a well county parameter 412, while values do not match for a start date parameter 404, and further that the surface clean volume parameter 414 is zero or null for both incoming file X or existing file Y. If so, the files are identified as being associated with two different, unsuccessful jobs. Thus, as indicated in the action column 416, both files are identified as source files available for use in data mining and analysis.

A sixth test 430 involves checking if values match between an incoming file X and an existing file Y for a start date parameter 404, a company or client parameter 406, a well name parameter 408, a well number parameter 410, and a well county parameter 412, and that a value for the file name parameter 402 for a recalculated file matches the value of the file name parameter 402 for the other file. Essentially, this test determines whether two files had a number of the same values and whether the value of the file name parameter 402 for the recalculated file matches the file name for the other file with the appendage "Recalc*" (where the asterisk indicates other characters, indicating that the file is a recalculated file, although other designations for a recalculated file may also be used). If so, the files are identified as likely being associated with the same job but where one of the files was recalculated or updated. Thus, as indicated in the action column 416, the recalculated file is identified as a source file, and the other file is identified as a duplicate.

A seventh test 432 involves checking if values match between an incoming file X and an existing file Y for a start date parameter 404, if values match between an incoming file X and a recalculated existing file Y for a job name parameter 402, and if the a surface clean volume parameter 414 is zero or null for the incoming file X. If so, the files are identified as likely being associated with the same job but where the initial file was incomplete and was subsequently recalculated or updated. Thus, as indicated in the action column 416, the recalculated file is identified as a source file, and the other file is identified as a duplicate.

An eighth test 434 involves checking if values match between an incoming file X and an existing file Y for a start date parameter 404, if values match between an incoming recalculated file X and existing file Y for a job name parameter 402, and if the a surface clean volume parameter 414 is zero or null for the existing file Y. If so, the files are identified as likely being associated with the same job but where the initial file was incomplete and was subsequently recalculated or updated. Thus, as indicated in the action column 416, the recalculated file is identified as a source file, and the other file is identified as a duplicate.

A ninth test 436 involves checking if values match between an incoming file X and an existing file Y for a start date parameter 404, a company or client parameter 406, a well name parameter 408, a well number parameter 410, and a well county parameter 412 before a recalculation of each file and if a job name parameter 402 matches after a recalculation of both files. If so, the files are identified as likely being associated with the same job but where both files were subsequently recalculated or updated. Thus, as indicated in the action column 416, the recalculated file with the highest recalculation number is identified as a source file, and the other file is identified as a duplicate.

Tests other than those illustrated in FIG. 4 can also be used. As just one example, a test could involve checking if values match between an incoming file X and an existing file Y for a start date parameter 404 and a surface clean volume parameter 414 and any three parameter values for the following group: a well name parameter, a well number parameter, a well county parameter, an API well number parameter, a job sales order parameter, a well state parameter, and a company or client parameter. Implementations may also include other tests that use different sets of parameters, which may or may not overlap with the parameters discussed in connection with FIG. 4.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer-readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer-readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, mobile device, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

In general, innovative aspects of the subject matter described in this disclosure may be embodied in methods that include the actions of identifying a well job data file for storage in a well job data archive; performing an initial duplicate check to determine if the well job data file is a duplicate of a data file stored in the well job data archive; performing a secondary duplicate check on the well job data file to determine if the well job data file is a duplicate of a data file stored in the well job data archive; identifying at least one of the well job data file or one or more of the data files stored in the well job data archive as a duplicate data file based on the secondary duplicate check; and storing the well job data file in the well job data archive in accordance with the secondary duplicate check and the identification of a duplicate data file. The initial duplicate check is based on information related to at least one of a size of the well job data file and a size of one or more data files stored in the well job data archive or a checksum of the well job data file and a checksum of one or more data files stored in the well job data archive, and the secondary duplicate check includes comparing values of a plurality of parameters contained in the well job data file to values of corresponding parameters of one or more data files stored in the well job data archive. Other embodiments of this aspect include corresponding systems, apparatus, and computer programs, configured to perform the actions of the methods encoded on computer storage devices.

These and other embodiments can each optionally include one or more of the following features. The initial duplicate check includes determining if the well job data file is a duplicate of a data file stored in the well job data archive based on a file size and a checksum for the well job data file and for a data file stored in the well job data archive. The initial duplicate check includes determining if the well job data file is identical to a data file in the well job data archive and the secondary duplicate check includes determining if the well job data file corresponds to a same well job as a data file in the well job data archive. The plurality of parameters used in the secondary duplicate check include two or more of job identification information, well identification information, well location, a job-related date, a job client, or another parameter associated with a job (e.g., a parameter indicating that a job has actually been performed, such as a volume of fluids associated with the job). Identifying at least one of the well job data file or one or more of the data files stored in the well job data archive as a duplicate data file based on the secondary duplicate check includes identifying a duplicate file corresponding to a restarted job based on a job-related date parameter including different job-related date values for the well job data file and a data file in the well job data archive and a plurality of other parameters having identical values for the well job data file and a data file in the well job data archive. Identifying at least one of the well job data file or one or more of the data files stored in the well job data archive as a duplicate data file based on the secondary duplicate check includes identifying a duplicate file corresponding to an updated job file based on a job identifier parameter including different job identifier values and a plurality of other parameters having identical values for the well job data file and a data file in the well job data archive. Identifying at least one of the well job data file or one or more of the data files stored in the well job data archive as a duplicate data file based on the secondary duplicate check includes identifying a duplicate file corresponding to an updated job file based on a plurality of parameters having identical values for the well job data file and a data file in the well job data archive. A quality assurance check is performed on the well job data file after performing the secondary duplicate check. The quality assurance check includes a check of a plurality of critical parameter values and a check of a plurality of non-critical parameter values, and storing the well job data file in the well job data archive is performed in accordance with results of the quality assurance check. A failed check of a critical parameter value is identified, a user is notified of the failed check of a critical parameter value, and data is stored in the well job data archive indicating that the well job data file failed a check of a critical parameter value. A failed check of a non-critical parameter value is identified, and a user is notified of the failed check of a non-critical parameter value. The well job data file contains information related to a well stimulation treatment for a single production well.

Additional innovative aspects of the subject matter described in this disclosure may be embodied in systems that include a well job data archive that stores a plurality of well job data files and a server system that includes one or more servers that store instructions, wherein the instructions, when executed by one or more computers cause the one or more computers to perform an initial duplicate check to determine if a well job data file is a duplicate of a data file stored in the well job data archive; perform a secondary duplicate check on the well job data file to determine if the well job data file is a duplicate of a data file stored in the well job data archive; identify at least one of the well job data file or one or more of the data files stored in the well job data archive as a duplicate data file based on the secondary duplicate check; and store the well job data file in the well job data archive in accordance with the secondary duplicate check and the identification of a duplicate data file. The initial duplicate check is based on information related to at least one of: a size of the well job data file and a size of one or more data files stored in the well job data archive; or a checksum of the well job data file and a checksum of one or more data files stored in the well job data archive. The secondary duplicate check includes comparing values of a plurality of parameters contained in the well job data file to values of corresponding parameters of one or more data files stored in the well job data archive.

While this specification contains many implementation details, these should not be construed as limitations on the scope of the invention or of what may be claimed, but rather as descriptions of features specific to particular implementations of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying a well job data file for storage in a well job data archive;
   performing an initial duplicate check to determine if the well job data file is a duplicate of a data file stored in the well job data archive, wherein the initial duplicate check is based on information related to at least one of a size of the well job data file and a size of one or more data files stored in the well job data archive or a checksum of the well job data file and a checksum of one or more data files stored in the well job data archive;

performing a secondary duplicate check on the well job data file to determine if the well job data file is a duplicate of a data file stored in the well job data archive, wherein the secondary duplicate check includes comparing values of a plurality of parameters contained in the well job data file to values of corresponding parameters of one or more data files stored in the well job data archive, wherein the plurality of parameters used in the secondary duplicate check include two or more of job identification information, well identification information, well location, a job-related date, a job client, or a volume of fluids associated with a job, wherein the initial duplicate check includes determining if the well job data file is identical to a data file in the well job data archive and the secondary duplicate check includes determining if the well job data file corresponds to a same well job as a data file in the well job data archive;

identifying at least one of the well job data file or one or more of the data files stored in the well job data archive as a duplicate data file based on the secondary duplicate check; and storing the well job data file in the well job data archive in accordance with the secondary duplicate check and the identification of a duplicate data file.

2. The method of claim 1 wherein the initial duplicate check includes determining if the well job data file is a duplicate of a data file stored in the well job data archive based on a file size and a checksum for the well job data file and for a data file stored in the well job data archive.

3. The method of claim 1 wherein identifying at least one of the well job data file or one or more of the data files stored in the well job data archive as a duplicate data file based on the secondary duplicate check includes identifying a duplicate file corresponding to a restarted job based on a job-related date parameter including different job-related date values for the well job data file and a data file in the well job data archive and a plurality of other parameters having identical values for the well job data file and a data file in the well job data archive.

4. The method of claim 1 wherein identifying at least one of the well job data file or one or more of the data files stored in the well job data archive as a duplicate data file based on the secondary duplicate check includes identifying a duplicate file corresponding to an updated job file based on a job identifier parameter including different job identifier values and a plurality of other parameters having identical values for the well job data file and a data file in the well job data archive.

5. The method of claim 1 wherein identifying at least one of the well job data file or one or more of the data files stored in the well job data archive as a duplicate data file based on the secondary duplicate check includes identifying a duplicate file corresponding to an updated job file based on a plurality of parameters having identical values for the well job data file and a data file in the well job data archive.

6. The method of claim 1 further comprising performing a quality assurance check on the well job data file after performing the secondary duplicate check, wherein the quality assurance check includes a check of a plurality of critical parameter values and a check of a plurality of non-critical parameter values, and storing the well job data file in the well job data archive is performed in accordance with results of the quality assurance check.

7. The method of claim 6 further comprising:
identifying a failed check of a critical parameter value;
notifying a user of the failed check of a critical parameter value; and
storing data in the well job data archive indicating that the well job data file failed a check of a critical parameter value.

8. The method of claim 6 further comprising:
identifying a failed check of a non-critical parameter value; and
notifying a user of the failed check of a non-critical parameter value.

9. The method of claim 1 wherein the well job data file contains information related to a well stimulation treatment for a single production well.

10. A system comprising:
a well job data archive that stores a plurality of well job data files;
a server system including one or more servers that store instructions, wherein the instructions, when executed by one or more computers, cause the one or more computers to:
perform an initial duplicate check to determine if a well job data file is a duplicate of a data file stored in the well job data archive, wherein the initial duplicate check is based on information related to at least one of:
a size of the well job data file and a size of one or more data files stored in the well job data archive; or
a checksum of the well job data file and a checksum of one or more data files stored in the well job data archive;
perform a secondary duplicate check on the well job data file to determine if the well job data file is a duplicate of a data file stored in the well job data archive, wherein the secondary duplicate check includes comparing values of a plurality of parameters contained in the well job data file to values of corresponding parameters of one or more data files stored in the well job data archive, wherein the plurality of parameters used in the secondary duplicate check include two or more of job identification information, well identification information, well location, a job-related date, a job client, or a volume of fluids associated with a job, wherein the initial duplicate check includes determining if the well job data file is identical to a data file in the well job data archive and the secondary duplicate check includes determining if the well job data file corresponds to a same well job as a data file in the well job data archive;
identify at least one of the well job data file or one or more of the data files stored in the well job data archive as a duplicate data file based on the secondary duplicate check; and
store the well job data file in the well job data archive in accordance with the secondary duplicate check and the identification of a duplicate data file.

11. The system of claim 10 wherein the well job data file contains information related to a well stimulation treatment for a single production well.

12. The system of claim 10 wherein the initial duplicate check includes determining if the well job data file is a duplicate of a data file stored in the well job data archive based on a file size and a checksum for the well job data file and for a data file stored in the well job data archive.

13. The system of claim 10 wherein identifying at least one of the well job data file or one or more of the data files stored in the well job data archive as a duplicate data file based on the secondary duplicate check includes identifying a duplicate file corresponding to a restarted job based on a job-related date parameter including different job-related date values for the well job data file and a data file in the well job data archive and a plurality of other parameters having identical values for the well job data file and a data file in the well job data archive.

14. The system of claim 10 wherein identifying at least one of the well job data file or one or more of the data files stored in the well job data archive as a duplicate data file based on the secondary duplicate check includes identifying a duplicate file corresponding to an updated job file based on a job identifier parameter including different job identifier values and a plurality of other parameters having identical values for the well job data file and a data file in the well job data archive.

15. The system of claim 10 wherein identifying at least one of the well job data file or one or more of the data files stored in the well job data archive as a duplicate data file based on the secondary duplicate check includes identifying a duplicate file corresponding to an updated job file based on a plurality of parameters having identical values for the well job data file and a data file in the well job data archive.

16. The system of claim 10 wherein the one or more servers further store instructions that, when executed by one or more computers, cause the one or more computers to perform a quality assurance check on the well job data file after performing the secondary duplicate check, wherein the quality assurance check includes a check of a plurality of critical parameter values and a check of a plurality of non-critical parameter values, and storing the well job data file in the well job data archive is performed in accordance with results of the quality assurance check.

17. A computer storage medium encoded with a computer program, the program comprising instructions that when executed by data processing apparatus cause the data processing apparatus to perform operations comprising:

performing an initial duplicate check to determine if a well job data file is a duplicate of a data file stored in the well job data archive, wherein the initial duplicate check is based on information related to at least one of:

a size of the well job data file and a size of one or more data files stored in the well job data archive; or a checksum of the well job data file and a checksum of one or more data files stored in the well job data archive;

performing a secondary duplicate check on the well job data file to determine if the well job data file is a duplicate of a data file stored in the well job data archive, wherein the secondary duplicate check includes comparing values of a plurality of parameters contained in the well job data file to values of corresponding parameters of one or more data files stored in the well job data archive, wherein the plurality of parameters used in the secondary duplicate check include two or more of job identification information, well identification information, well location, a job-related date, a job client, or a volume of fluids associated with a job, wherein the initial duplicate check includes determining if the well job data file is identical to a data file in the well job data archive and the secondary duplicate check includes determining if the well job data file corresponds to a same well job as a data file in the well job data archive;

identifying at least one of the well job data file or one or more of the data files stored in the well job data archive as a duplicate data file based on the secondary duplicate check; and storing the well job data file in the well job data archive in accordance with the secondary duplicate check and the identification of a duplicate data file.

* * * * *